United States Patent
Liu et al.

(10) Patent No.: US 12,438,151 B2
(45) Date of Patent: Oct. 7, 2025

(54) POSITIVE ELECTRODE ACTIVE MATERIAL AND ITS PREPARATION METHOD, SODIUM ION BATTERY AND APPARATUS CONTAINING THE SODIUM ION BATTERY

(71) Applicant: CONTEMPORARY AMPEREX TECHNOLOGY (HONG KONG) LIMITED, Hong Kong (CN)

(72) Inventors: Qian Liu, Ningde (CN); Yongsheng Guo, Ningde (CN); Chengdu Liang, ningde (CN); Wenguang Lin, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 965 days.

(21) Appl. No.: 17/371,231

(22) Filed: Jul. 9, 2021

(65) Prior Publication Data
US 2021/0336258 A1     Oct. 28, 2021

Related U.S. Application Data

(63) Continuation of application No. PCT/CN2020/070135, filed on Jan. 2, 2020.

(30) Foreign Application Priority Data

Jan. 11, 2019  (CN) .......................... 201910026561.1

(51) Int. Cl.
  H01M 4/505   (2010.01)
  H01M 4/02    (2006.01)
  (Continued)

(52) U.S. Cl.
  CPC ......... *H01M 4/505* (2013.01); *H01M 4/0471* (2013.01); *H01M 4/525* (2013.01);
  (Continued)

(58) Field of Classification Search
  CPC ........................... H01M 4/505; H01M 10/054
  See application file for complete search history.

(56) References Cited

U.S. PATENT DOCUMENTS

2017/0217774 A1*  8/2017  Ikejiri ..................... C01B 25/45
2018/0351197 A1* 12/2018  Sakai .................... H01M 4/623

FOREIGN PATENT DOCUMENTS

CN    104617288 A    5/2015
CN    104795551 A    7/2015
(Continued)

OTHER PUBLICATIONS

Jiang, Kezhu, et al. "A phase-transition-free cathode for sodium-ion batteries with ultralong cycle life." Nano Energy 52 (2018): 88-94. (Year: 2018).*

(Continued)

*Primary Examiner* — Allison Bourke
*Assistant Examiner* — Kayla Elaine Clary
(74) *Attorney, Agent, or Firm* — East IP P.C.

(57) ABSTRACT

The present application discloses a positive electrode active material and its preparation method, a sodium ion battery and an apparatus containing the sodium ion battery. The positive electrode active material satisfies a chemical formula $Na_{2+x}Cu_hMn_kM_lO_{7-y}$, wherein M is one or more selected from Li, B, Mg, Al, K, Ca, Ti, V, Cr, Fe, Co, Ni, Zn, Ga, Sr, Y, Nb, Mo, Sn, Ba and W, $0 \leq x \leq 0.5$, $0.1 < h \leq 2$, $1 \leq k \leq 3$, $0 \leq l \leq 0.5$, and $0 \leq y \leq 1$, $2 \leq h+k+l \leq 3.5$, and $0.57 \leq (2+x)/(h+k+l) \leq 0.9$.

15 Claims, 3 Drawing Sheets

(51) Int. Cl.
  *H01M 4/04* (2006.01)
  *H01M 4/525* (2010.01)
  *H01M 10/054* (2010.01)

(52) U.S. Cl.
  CPC .... *H01M 10/054* (2013.01); *H01M 2004/021* (2013.01); *H01M 2004/028* (2013.01)

(56) References Cited

FOREIGN PATENT DOCUMENTS

| | | |
|---|---|---|
| CN | 104795552 A | 7/2015 |
| CN | 104795552 B | 8/2016 |
| CN | 106531982 A | 3/2017 |
| CN | 104617288 B | 5/2017 |
| CN | 108140826 A | 6/2018 |
| CN | 108923042 A | 11/2018 |
| EP | 3048659 A1 | 7/2016 |
| JP | 2015176678 A | 10/2015 |
| WO | 2016/156447 A1 | 10/2016 |

OTHER PUBLICATIONS

Yue et al. "Study on the effect of intrinsic electrical resistivity of silicon materials on its performance for Li-ion batteries." Materials Letters 186 (2017): 217-219. (Year: 2017).*
Satyavani et al. "Effect of particle size on dc conductivity, activation energy and diffusion coefficient of lithium iron phosphate in Li-ion cells." Engineering Science and Technology, an International Journal 19.1 (2016): 40-44. (Year: 2016).*
PCT International Search Report for PCT/CN2020/070135, dated Apr. 1, 2020, 17 pages.
The First Office Action for China Application No. 201910026561.1, dated Dec. 18, 2020, 10 pages.
The Second Office Action for China Application No. 201910026561.1, dated Feb. 4, 2021, 10 pages.
The Rejection decision Action for China Application No. 201910026561.1, dated Apr. 28, 2021, 6 pages.
Lituo Zheng et al. Crystal Structures and Electrochemical Performance of Air-Stable $Na_{2/3}Ni_{1/3-x}Cu_xMn_{2/3}O_2$ in Sodium Cells. Chemistry of Materials, No. 29, p. 1623-1631, dated Jan. 25, 2017.
Kezhu Jiang et al. A phase-transition-free cathode for sodium-ion batteries with ultralong cycle life. Nano Energy,No. 52, p. 88-94 dated Jul. 23, 2018.
Wang Minghua et al. Metallurgical Industry Press.Introduction to New Energy, p. 168, dated May 31, 2014.
The First Examination Report for EP Application No. 20738579.0, dated Jul. 7, 2022, 5 pages.
The extended European search report for EP Application No. 20738579.0, dated Feb. 14, 2022, 8 pages.

* cited by examiner

POSITIVE ELECTRODE ACTIVE MATERIAL AND ITS PREPARATION METHOD, SODIUM ION BATTERY AND APPARATUS CONTAINING THE SODIUM ION BATTERY

CROSS-REFERENCE OF RELEVANT APPLICATION

This application is a continuation of International Application No. PCT/CN2020/070135, filed on Jan. 2, 2020, which claims priority of Chinese patent application No. 201910026561.1 entitled "positive electrode active material, positive electrode plate, and sodium ion battery" and filed on Jan. 11, 2019, both of which are incorporated herein by reference in their entireties.

TECHNICAL FIELD

This application belongs to the technical field of energy storage apparatuses, and specifically involves a positive electrode active material and its preparation method, a sodium ion battery, and an apparatus containing the sodium ion battery.

BACKGROUND TECHNOLOGY

At present, a lithium-ion battery dominates the power battery. Nevertheless, the lithium-ion battery is facing a great challenge, such as the increasing shortage of lithium resources, the continuous increase of upstream material price, the sluggish development of recycling technology, and a low recycling rate of old and used batteries. Sodium ion batteries can realize charging and discharging by an intercalation-deintercalation process between positive and negative electrodes. Moreover, compared with lithium, sodium has the advantages of much richer reserves, wider distribution, and lower cost. Therefore, the sodium ion battery is likely to become a new generation of electrochemical system to replace the lithium-ion battery. However, cycle performance of a sodium ion battery under extensive research at present is relatively poor, which hinders the commercialization progress of sodium ion battery.

SUMMARY

In a first aspect, this application provides a positive electrode active material that satisfies the chemical formula of $Na_{2+x}Cu_hMn_kM_lO_{7-y}$, where M is one or more selected from Li, B, Mg, Al, K, Ca, Ti, V, Cr, Fe, Co, Ni, Zn, Ga, Sr, Y, Nb, Mo, Sn, Ba, and W, $0 \leq x \leq 0.5$, $0.1 < h \leq 2$, $1 \leq k \leq 3$, $0 \leq l \leq 0.5$, and $0 \leq y \leq 1$; wherein, $2 \leq h+k+l \leq 3.5$, and $0.57 \leq (2+x)/(h+k+l) \leq 0.9$.

In a second aspect, this application provides a method for preparing a positive electrode active material, including the following steps:
  providing a mixed solution, wherein the mixed solution comprises copper salts and manganese salts, and the salts containing an Mn element is present in the mixed solution in an amount of 0 or more;
  adding a precipitant and a complexing agent into the mixed solution, and then subjecting it to coprecipitation to obtain a precursor; and
  mixing the precursor and a sodium source to obtain a mixture and sintering the mixture to obtain the positive electrode active material,
  wherein the positive electrode active material satisfies a chemical formula $Na_{2+x}Cu_hMn_kM_lO_{7-y}$, where M is one or more selected from of Li, B, Mg, Al, K, Ca, Ti, V, Cr, Fe, Co, Ni, Zn, Ga, Sr, Y, Nb, Mo, Sn, Ba and W; $0 \leq x \leq 0.5$, $0.1 < h \leq 2$, $1 \leq k \leq 3$, $0 \leq l \leq 0.5$, $0 \leq y \leq 1$, $2 \leq h+k+l \leq 3.5$, and $0.57 \leq (2+x)/(h+k+l) \leq 0.9$.

In a third aspect, this application provides a sodium ion battery comprising a positive electrode plate containing the positive electrode active material in the first aspect of this application.

In the fourth aspect, this application provides an apparatus comprising the sodium ion battery in the third aspect of this application.

Compared with the existing technologies, this application at least has the following beneficial effects.

The positive electrode active material provided in this application satisfies the chemical formula of $Na_{2+x}Cu_hMn_kM_lO_{7-y}$, with a specific chemical composition, which enable the positive electrode active material to have relatively high ionic and electronic conductivity, and relative high structural stability so that the positive electrode active material is of relatively high cycle performance. The sodium ion battery adopting this positive electrode active material achieves a relatively high cycle performance as a result. More optionally, the positive electrode active material also has a relatively high rate capability, which can improve the rate performance of sodium ion battery in turn.

Particularly optionally, the positive electrode active material also has two relatively high charge/discharge voltage plateaus, which are relatively long and flat. Moreover, the capacity of these voltage plateaus accounts for a higher ratio of the full charge capacity of the corresponding cycle. Thus, the charging/discharge capacity elaboration and material utilization rate of the positive electrode active material are improved. Therefore, the sodium ion battery adopting this positive electrode active material achieves a relatively high energy density.

The apparatus of this application includes the sodium ion battery provides in this application so that it at least has the same advantages as the said sodium ion battery.

DESCRIPTION OF THE DRAWINGS

In order to explain the technical solutions of the embodiments of the present application more clearly, the following will briefly introduce the drawings that need to be used in the embodiments of the present application. Obviously, the drawings described below are only some embodiments of the present application. A person of ordinary skill in the art can obtain other drawings based on the drawings without creative work.

DETAILED DESCRIPTION

In order to make the objectives, technical solutions and beneficial technical effects of the present application clearer, the present application will be further described in detail below in conjunction with embodiments. It should be understood that the embodiments described in this specification are only for explaining the application, not intending to limit the application.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value as its own lower limit or upper limit or combined with other lower limit or upper limit to form a range that is not explicitly specified.

In the description herein, it should be noted that, unless otherwise specified, a numeric range described with the term "above" or "below" includes the lower or upper limit itself, and "more" in "one or more" means two or more.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

Positive Electrode Active Material

Firstly, the positive electrode active material in the first aspect of this application is described. This positive electrode active material satisfies the chemical formula of $Na_{2+x}Cu_hMn_kM_lO_{7-y}$, where M is a doping element at the transitional metal site and is one or more selected from Li, B, Mg, Al, K, Ca, Ti, V, Cr, Fe, Co, Ni, Zn, Ga, Sr, Y, Nb, Mo, Sn, Ba, and W, $0 \le x \le 0.5$, $0.1 < h \le 2$, $1 \le k \le 3$, $0 \le l \le 0.5$, and $0 \le y \le 1$; wherein, $2 \le h+k+l \le 3.5$, and $0.57 \le (2+x)/(h+k+l) \le 0.9$.

The number of sodium atoms in the chemical formula of the positive electrode active material is 2 or more, which is conducive to improving the first-cycle charging/discharge capacity of the positive electrode active material. The number of sodium atoms in the chemical formula is preferred to be less than 2.5, which is conducive to improving the stability of the positive electrode active material to air, water, and $CO_2$, and reducing the capacity loss of the positive electrode active material during the charging/discharging cycle and storage, so that the positive electrode active materials have a relatively high capacity retention ratio.

The positive electrode active material satisfies $2 \le h+k+l \le 3.5$, and $0.57 \le (2+x)/(h+k+l) \le 0.9$, which can allow the positive electrode active material to have fewer defects of chemical composition, reduce impurity phases in the material, and improve internal structure and structural stability of the positive electrode active material. Particularly, this positive electrode active material also has a relatively high migration rate of sodium ion and electron, which enables the positive electrode active material to have relatively high ionic and electronic conductivity. Therefore, this positive electrode active material has relatively high capacity elaboration and relatively high cycle performance and rate performance. The sodium ion battery adopting this positive electrode active material achieves a relatively high energy density, cycle performance, and rate performance. Besides, polarization phenomenon of this battery is also reduced, and its cycle life may be further improved.

In some embodiments, $(2+x)/(h+k+l)$ can be $\ge 0.57$, $\ge 0.60$, $\ge 0.62$, $\ge 0.64$, $\ge 0.66$, $\ge 0.68$, $\ge 0.70$, $\ge 0.72$, $\ge 0.74$, or $\ge 0.75$. Further, $(2+x)/(h+k+l)$ can be $\le 0.90$, $\le 0.85$, $\le 0.80$, $\le 0.78$, $\le 0.77$, $\le 0.76$, $\le 0.75$, $\le 0.74$, $\le 0.73$, $\le 0.72$, or $\le 0.71$. Optionally, $0.6 \le (2+x)/(h+k+l) \le 0.8$. The positive electrode active material satisfying $(2+x)/(h+k+l)$ within an proper range can have a better comprehensive electrochemical performance, and its capacity, cycle performance, and rate performance can be further improved.

The positive electrode active material satisfies $0.1 \le h \le 2$ and $1 \le k \le 3$. In the charging/discharging process of this positive electrode active material, the transfer of electrons of Cu and Mn provides an effective charge compensation for the de-intercalation and intercalation of sodium ions, thereby improving the charge/discharge voltage plateau of the positive electrode active material and enabling the positive electrode active material to have a relatively high specific capacity.

In some embodiments, the positive electrode active material can satisfy $0.5 \le h \le 1.5$ and $1.5 \le k \le 2.5$, which allows the positive electrode active material to have a relatively gram volume and a relatively high capacity retention ratio during the charging/discharging cycle.

Figure 1:
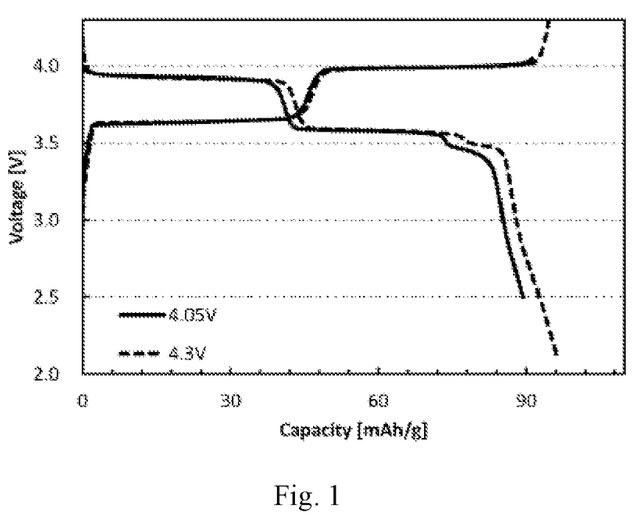
FIG. 1 is a first-cycle charging/discharging curve graph of the sodium ion battery provided in Example 6 of this application.
Figure 2:
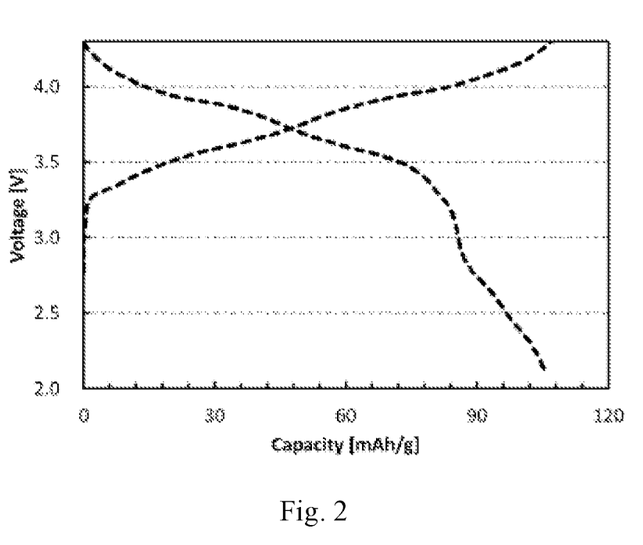
FIG. 2 is a first-cycle charging/discharging curve graph of the sodium ion battery provided in Example 11 of this application.

In some embodiments, the positive electrode active material can satisfy $0.9 \le h \le 1.5$ and $1.5 \le k \le 2.5$. Optionally, $0.9 \le h \le 1.2$ and $1.5 \le k \le 2.5$. As shown in FIG. 1, this positive electrode active material has a first discharge voltage plateau from 3.8V to 4.1V and a second discharge voltage plateau from 3.4V to 3.7V, and the charge/discharge voltage plateaus are relatively wide and flat. Therefore, the positive electrode active material satisfying h and k within a proper range improves the ratio of the capacity of voltage plateau thereof to the full charge capacity of the corresponding cycle, and behaves with a relatively high charging/discharging stability, so that the positive electrode active material has a relatively high charging/discharge capacity elaboration and material utilization rate. Besides, the positive electrode active material can also have relatively high cycle stability.

More optionally, this positive electrode active material has a discharge capacity $Q_1$ at the first discharge voltage plateau, a discharge capacity $Q_2$ at the second discharge voltage plateau, and a full discharge capacity Q that satisfy the relationship of $30\% \le (Q_1+Q_2)/Q \times 100\% \le 90\%$, optionally, $50\% \le (Q_1+Q_2)/Q \times 100\% \le 80\%$.

More preferable, the discharge capacity $Q_1$ of this positive electrode active material at the first discharge voltage plateau is from 30 mAh/g to 55 mAh/g, and the discharge capacity $Q_2$ at the second discharge voltage plateau is from 30 mAh/g to 75 mAh/g. This positive electrode active material behaves with a relatively high voltage plateau discharge capacity.

The full discharge capacity of the above mentioned positive electrode active material refers to a discharge capacity at which a sodium ion battery charged to a charge cut-off voltage is discharged to a discharge cut-off voltage.

The discharge voltage plateau and discharge capacity of the positive electrode active material are measured by charging a battery to a charge cut-off voltage at the constant current of 0.1 C and discharging it to a discharge cut-off voltage at 0.1 C. The tested battery is composed of a positive electrode plate comprising a positive electrode active material, a conductive carbon black, and a binder polyvinylidene fluoride at a weight ratio of 90:5:5, and a sodium metal plate as a negative electrode.

In some embodiments, the positive electrode active material can satisfy k/(h+l)≥1.4, which can further improve the capacity elaboration and kinetic performance of the positive electrode active material and endow the positive electrode active material with a higher first-cycle specific discharge capacity and rate performance. Optionally, 1.6≤k/(h+l)≤6.

In some embodiments, the positive electrode active material can satisfy 0≤l≤0.5. By doping M element at the transitional metal site, specific capacity and rate performance of the positive electrode active material can be further improved.

Optionally, M can be one or more selected from Li, Zn, B, Mg, Al, Ti, Fe, Co, Ni, and W. More optionally, M can be one or more selected from Li, Zn, Ti, Fe, Ni, and W. Particularly optionally, M can be one or more selected from Zn, B, Ti, and W.

In some embodiments, the specific surface area of the positive electrode active material is preferable to be from 0.01 m$^2$/g to 20 m$^2$/g, more preferable to be from 0.1 m$^2$/g to 15 m$^2$/g, and particularly preferable to be from 0.1 m$^2$/g to 5 m$^2$/g. When the specific surface area of the positive electrode active material is more than 0.01 m$^2$/g, it can ensure that the positive electrode active material has a relatively small particle size, and that the transmission path between sodium ions and electrons is relatively short, which can improve the ionic and electronic conductivity of the positive electrode active material, thereby improving the electrochemical kinetics performance and rate performance during its charging/discharging process. Meanwhile, the sodium ion battery adopting this positive electrode active material has a relatively small positive polarization phenomenon, thereby improving the capacity retention ratio in the charging/discharging cycle process. The positive electrode active material having a specific surface area of less than 20 m$^2$/g ensure that the particle size of the positive electrode active material is not excessively small, so that the positive electrode active material can both have relatively high electrochemical performance and the agglomeration between the particles of the positive electrode active material may be effectively inhibited, thereby enabling the positive electrode to have relatively high rate performance and cycle performance.

The positive electrode active material having a specific surface area within a proper range can reduce imbibition phenomenon during the preparation of positive electrode slurry and improve solid content and particle dispersion uniformity of the positive electrode slurry, thereby improving the particle dispersion uniformity and compaction density of the positive electrode active material layer, the energy density of batteries, and the rate performance and cycle performance of batteries.

In some embodiments, the average particle size D$_v$50 of the positive electrode active material is preferable to be from 0.5 μm to 25 μm, more preferable to be from 1 μm to 15 μm, and particularly preferable to be from 8 μm to 15 μm.

In some embodiments, the tap density of the positive electrode active material is preferable to be from 0.5 g/cm$^3$ to 3.5 g/cm$^3$, more preferable, from 1.5 g/cm$^3$ to 3.0 g/cm$^3$.

In some embodiments, the compaction density of the positive electrode active material at a pressure of 8 tons is preferable to be from 2.5 g/cm$^3$ to 4.5 g/cm$^3$, more preferable, from 3.5 g/cm$^3$ to 4.5 g/cm$^3$. The positive electrode plate adopting this positive electrode active material can have a relatively high compaction density, thereby improving the energy density of batteries.

In some embodiments, the powder resistivity of the positive electrode active material at a pressure of 12 MPa is preferable to be from 10 Ω·cm to 300 kΩ·cm, more preferable, from 20 Ω·cm to 3 kΩ·cm. The positive electrode active material having a powder resistivity within a proper range can further improve the rate performance of sodium ion battery and endow the sodium ion battery with relatively high safety performance.

In some embodiments, the shape of the positive electrode active material is preferable to be one or more of sphere, globoid, and polygon flake. Spherical and globoid positive electrode active materials can be secondary particles composed of primary particle by aggregation, and the shape of primary particle can be sphere, globoid, or flake. The positive electrode active material with a polygon-flake structure can be one or more of triangular flake, tetragonal flake, and hexagonal flake. The positive electrode active material with a proper shape can have a more stable structure during the charging/discharging cycle so that the sodium ion battery can have a better cycle performance.

In some embodiments, the positive electrode active material has a triclinic phase crystal structure or a hexagonal phase crystal structure. This positive electrode active material has a better structural stability, and its structural change caused by the process of de-intercalation and intercalation of sodium ions is relatively small, constituting a good main framework for the reversible de-intercalation and intercalation of sodium ions. Therefore the positive electrode active material may have improved capacity elaboration and cycle performance.

Furthermore, when the positive electrode active material is of the triclinic phase structure, its X-ray diffraction spectrum comprises a first diffraction peak at an X-ray diffraction angle 2θ of from 15.8° to 16.0° generated by (110) crystal plane and a second diffraction peak at an X-ray diffraction angle 2θ of from 32.0° to 32.2° generated by (202) crystal plane, and an intensity ratio of the first diffraction peak to the second diffraction peak is from 5 to 30, the first diffraction peak has a full width at half maxima (FWHM) of from 0.02° to 0.5°, and the second diffraction peak has a full width at half maxima (FWHM) of from 0.02° to 0.5°.

Furthermore, when the positive electrode active material is of the hexagonal phase structure, its X-ray diffraction spectrum comprises a first diffraction peak at an X-ray diffraction angle 2θ of from 15.8° to 16.0° generated by (002) crystal plane and a second diffraction peak at an X-ray diffraction angle 2θ of from 32.0° to 32.2° generated by (004) crystal plane, and an intensity ratio of the first diffraction peak to the second diffraction peak is from 5 to 30; the first diffraction peak has a full width at half maxima of from 0.02° to 0.5°, and the second diffraction peak has a full width at half maxima of from 0.02° to 0.5°.

The positive electrode active material having the said crystal structure has a relatively good crystallinity degree, which is conducive to further improving the capacity elaboration and cycle performance of positive electrode active material.

The crystal structure of positive electrode active material can be measured by an X-ray powder diffractometer. For example, with Brucker D8A_A25 X-ray diffractometer of Brucker AxS, CuK$_\alpha$ ray is regarded as a radiation source, the ray wavelength λ=1.5418 Å, the scanning 2θ angle range is from 10° to 90°, and the scanning rate is 4°/min.

The specific surface area of positive electrode active material is of the meaning known in this field and can be measured by the known instruments and methods in this field. For example, it can be tested by the analysis test method of nitrogen adsorption specific surface area and calculated by BET (Brunauer Emmett Teller) method in which the analysis test method of nitrogen absorption specific surface area can be carried out by the Tri StarII specific surface and pore analyzer from Micromeritics, USA.

The average particle size of positive electrode active material $D_v50$ is of the meaning known in this field and can be measured by the instruments and methods known in this field. For example, it can be conveniently measured by a laser particle size analyzer, such as the Mastersizer 3000 laser particle size analyzer of Malvern Instrument, UK.

The shape of positive electrode active material can be measured by the instruments and methods known in this field. For example, it can be detected by a field emission scanning electron microscope, such as SIGMA 500 high-resolution field emission scanning electron microscope of Karl Zeiss AG, Germany.

The tap density of positive electrode active material can be measured by the instruments and methods known in this field. For example, it can be measured conveniently by a tap density tester, such as the FZS4-4B tap density tester.

The compaction density of positive electrode active material can be measured by the instruments and methods known in this field. For example, it can be measured conveniently by an electron pressure tester, such as the UTM7305 electron pressure tester.

In the following, the preparation method of the positive electrode active material provided in the second aspect of this application will be introduced. According to this preparation method, the said positive electrode active material can be prepared. The preparation method of the positive electrode active material includes the following steps:

S10. adding a copper salt, a manganese salt, and an optional salt containing M element to a solvent in a stoichiometric ratio to prepare a mixed solution;

S20. adding a precipitant and a complexing agent to the mixed solution to prepare a reaction solution, and adjusting a pH value of the reaction solution to a preset range;

S30. subjecting the reaction solution to coprecipitation reaction at a preset temperature and stirring speed, separating and collecting the resulting coprecipitation products, washing the precipitation products several times with a moderate amount of solvent, and drying them at a preset temperature to get a transitional metal source $[Cu_hMn_kM_l]X_u$, wherein X is a negative ion taken from the precipitant, and h, k, l, and u allow the chemical formula $[Cu_hMn_kM_l]X_u$ to be electrically neutral; and S40. mixing the transitional metal source and sodium source to obtain a mixture and sintering the mixture, and washing and drying the resulting sintering product to obtain the positive electrode active material.

As different reactants have different dissociation intensities in a solvent and a same reactant has different dissociation intensities in different solvents, the response rate is affected, including crystal nucleation and growth rate, so the chemical composition, specific surface area, particle size, shape, and crystal structure of the transitional metal source are affected, and finally the chemical composition, specific surface area, particle size, shape, and crystal structure of the positive electrode active material are affected. In addition, the oxidation valence state of metal atoms in reactants also affects the electrochemical performance of the final product—positive electrode active material.

In some preferred embodiments, in the step S10, the copper salt may include one or more of copper nitrate, copper chloride, copper sulfate, copper oxalate, and copper acetate, optionally, one or more of copper nitrate and copper sulfate. The manganese salt may include one or more of manganese nitrate, manganese chloride, manganese sulfate, manganese oxalate, and manganese acetate, optionally, one or more of manganese nitrate and manganese sulfate. The salt containing M element can be one or more of nitrates, chlorates, sulfates, oxalates, and acetates containing M element, optionally, one or more of nitrates and sulfates containing M element. For example, when M is Fe, the salt containing M element can include one or more of ferrous nitrate, ferric nitrate, ferrous chloride, ferric chloride, ferrous sulfate, ferric sulfate, ferrous oxalate, ferric oxalate, ferrous acetate, and ferric acetate, optionally, one or more of ferrous nitrate, ferric nitrate, ferrous sulfate, and ferric sulfate. For example, when M is Zn, the salt containing M element can include one or more of zinc nitrate, zinc chloride, zinc sulfate, zinc oxalate, and zinc acetate, optionally, one or more of zinc nitrate and zinc sulfate. The solvent can include one or more of deionized water, methanol, ethanol, acetone, isopropyl alcohol, and n-hexyl alcohol, optionally, deionized water.

Reactants having different concentrations in the reaction solution, on the one hand, enables the reactants to have different dissociation rates, thereby affecting the reaction rate, on the other hand, directly affects the reaction rate, thereby affecting the chemical composition and structure of the transitional metal source, and finally affecting the chemical composition and structure of the positive electrode active material.

In some preferred embodiments, in the step S10, the total concentration of metal ions in the mixed solution is preferable to be from 0.1 mol/L to 10 mol/L, more preferable, from 0.5 mol/L to 5 mol/L.

In the reaction system, the type and concentration of precipitant affect its reaction rate with metal ions, and the type and concentration of complexing agent significantly affect the crystal nucleation and growth of the transitional metal source, which both affect the chemical composition and structure of the transitional metal source.

In some preferred embodiments, in the step S20, the precipitant can include one or more of sodium hydroxide, potassium hydroxide, sodium bicarbonate, sodium carbonate, potassium bicarbonate, and potassium carbonate, optionally, one or more of sodium carbonate and sodium hydroxide. The complexing agent can include one or more of ammonia, ammonium carbonate, urea, hexamethylene tetramine, ethylenediamine tetraacetic acid, citric acid and ascorbic acid, optionally, ammonia.

The pH value of the reaction system affects the precipitation rate of every metal ion, thereby directly affecting the crystal nucleation and growth rate of the transitional metal source, further affecting the chemical composition and structure of the transitional metal source, and finally affecting the chemical composition and structure of the positive electrode active material. In order to achieve the positive electrode active material in this application, in the step S20, optionally, the pH value of the reaction solution is controlled to be from 6 to 13. More optionally, the pH value of the reaction solution is controlled to be from 10 to 12. When necessary, the pH value of the reaction solution can be adjusted by adjusting the type and content of precipitant and/or complexing agent.

In some examples, the step S20 can include:

S21. providing a solution of precipitant and a solution of complexing agent;

S22. Adding the solution of precipitant and the solution of complexing agent to the mixed solution to obtain a reaction solution, and adjusting a pH value of the reaction solution to a preset range.

In some examples, the step S21 comprises dispersing a precipitant into a solvent to obtain a solution of precipitant.

The solvent used for the solution of precipitant can be one or more of deionized water, methyl alcohol, ethyl alcohol, acetone, isopropyl alcohol, and n-hexyl alcohol.

In some examples, the concentration of precipitant in the solution of precipitant is preferable to be from 0.5 mol/L to 15 mol/L, more preferable, from 2 mol/L to 10 mol/L.

In some examples, the step S21 comprising dispersing a complexing agent into a solvent to obtain a solution of complexing agent.

The solvent used for the solution of complexing agent can be one or more of deionized water, methyl alcohol, ethyl alcohol, acetone, isopropyl alcohol, and n-hexyl alcohol.

In some examples, the concentration of complexing agent in the solution of complexing agent is preferable to be from 0.1 mol/L to 15 mol/L, more preferable, from 0.5 mol/L to 10 mol/L.

In addition, the temperature of the reaction system directly affects the chemical reaction rate and the reaction yield and the reaction time affects the growth process of reaction products, thereby affecting the chemical composition and structure of the reaction products. In some embodiments, optionally, in the step S30, the reaction temperature is from 25° C. to 70° C., more preferable, from 40° C. to 65° C., and particularly preferable, from 50° C. to 60° C. The reaction time is preferable to be from 10 h to 60 h, more preferable, from 15 h to 30 h.

The stirring rate during the reaction affects the mixing uniformity of materials so that it has an important influence on the effect of complexation and precipitation, and further affects the structure of the transitional metal source. In some embodiments, optionally, in the step S30, the stirring rate is from 200 rpm to 1600 rpm, for example, from 300 rpm to 1000 rpm, or from 500 rpm to 900 rpm. The abbreviation "rpm", refers to round per minute, which characterizes the number of revolution of the stirring equipment per minute.

In some embodiments, the drying temperature in the step S30 is preferable to be from 80° C. to 120° C. The drying time in the step S30 is preferable to be from 2 h to 48h.

In the step S40, the temperature and time of sintering affect the specific surface area, particle size, shape, and crystal structure of the reaction products. In some embodiments, optionally, in the step S40, the temperature of sintering is from 500° C. to 900° C., more optionally, from 550° C. to 850° C. The time of sintering is preferable to be from 4 h to 30 h, more preferable, from 8 h to 20 h.

In some embodiments, in the step S40, the sodium source can be one or more of sodium carbonate, sodium hydroxide, and sodium nitrate.

In the step S40, the sintering can be carried out in an air or oxygen atmosphere.

In the steps S30 and S40, the detergent used for washing and the number of washing are not specially restricted and can be selected according to the actual demand as long as the residual ions on the surface of products are removed. For example, deionized water can be used as a detergent.

During the preparation process of positive electrode active material, by comprehensively controlling the type and content of reactants, pH value, the type and concentration of precipitant, the type and concentration of complexing agent, reaction temperature, stirring rate, reaction time, and sintering temperature and time enables the positive electrode active material to have a specific chemical composition and structure stated in this application, which can greatly improve the electrochemical performance of the positive electrode active material and finally improve the specific capacity, rate performance, and cycle performance of the sodium ion battery.

Positive Electrode Plate

This application also provides a positive electrode plate comprising a positive electrode current collector and a positive electrode active material layer disposed on the positive electrode current collector. For example, the positive electrode current collector has two opposite surfaces and the positive electrode active material layer is laminated on either or both of the two surfaces of the positive electrode current collector.

A metal foil, a carbon-coated metal foil, or a porous metal sheet can be adopted for the positive electrode current collector, optionally, an aluminum foil.

The positive electrode active material layer includes the positive electrode active material in the first aspect of this application. Optionally, the positive electrode active material in the positive electrode active material layer is one or more of $Na_{2.2}Cu_{1.1}Mn_{2.0}O_7$, $Na_{2.0}Cu_{0.9}Mn_{2.0}O_7$, $Na_{2.0}Cu_{0.6}Mn_{2.4}O_7$, $Na_{2.0}Cu_{0.4}Mn_{2.4}Fe_{0.2}O_7$, and $Na_{2.0}Cu_{0.4}Mn_{2.4}Zn_{0.2}O_7$.

In some examples, the positive electrode active material layer can also include a binder. The binder can include one or more of styrene-butadiene rubber (SBR), water-based acrylic resin, sodium carboxymethyl cellulose (CMC-Na), polyvinylidene fluoride (PVDF), polytetrafluoroethylene (PTFE), ethylene-vinyl acetate copolymer (EVA) and polyvinyl alcohol (PVA).

In some examples, the positive electrode active material layer can also include a conductive agent. The conductive agent can include one or more of super-conductive carbon, acetylene black, carbon black, ketjen black, carbon dot, carbon nanotubes, graphene, and carbon nanofiber.

The positive electrode plate can be prepared according to the conventional method in this field. Usually, the positive electrode plate is obtained by dispersing the positive electrode active material and optional conductive agent and binder in a solvent (e.g., N-methyl-2-pyrrolidone. NMP for short) to form an uniform positive electrode slurry, coating a positive electrode current collector with the positive electrode slurry and then carrying out the processes of drying and cold pressing.

As the positive electrode plate of this application adopts the positive electrode active material in the first aspect of this application, it has a relatively high comprehensive electrochemical performance.

Sodium ion Battery

In a third aspect, this application provides a sodium ion battery including the said positive electrode plate containing one or more positive electrode active materials of this application.

Sodium ion battery also includes a negative electrode plate, a separator, and an electrolyte.

In some embodiments, the negative electrode plate can be a metallic sodium sheet.

In some embodiments, the negative electrode plate can include a negative electrode current collector and a negative electrode active material layer disposed on the negative electrode current collector. For example, the negative electrode current collector has two opposite surfaces and the negative electrode active material layer is laminated on either or both of the two surfaces of the negative electrode current collector.

In some embodiments, a metal foil, a carbon-coated metal foil, a porous metal sheet, and other materials can be adopted for the negative electrode current collector, optionally, a copper foil.

The negative electrode active material layer includes a negative electrode active material, which can be the known negative electrode active material in this field. As an example, the negative electrode active material can include, but is not limited to, one or more of natural graphite, artificial graphite, mesocarbon microbeads (MCMB), hard carbon, and soft carbon.

In some embodiments, the negative electrode active material layer can also include a conductive agent, which can be the known conductive agent used for battery negative electrode in this field. As an example, the conductive agent can include, but is not limited to, one or more of super-conductive carbon, acetylene black, carbon black, ketjen black, carbon dot, carbon nanotubes, graphene, and carbon nanofiber.

In some embodiments, the negative electrode active material layer can also include a binder, which can be the known binder used for battery negative electrode in this field. As an example, the binder can include, but is not limited to, one or more of styrene-butadiene rubber (SBR), water-based acrylic resin, and sodium carboxymethyl cellulose (CMC-Na).

In some examples, the negative electrode active material layer can also include a thickening agent, which can be the known thickening agent used for battery negative electrode in this field. As an example, the thickening agent can include, but not limited to, sodium carboxymethyl cellulose (CMC-Na).

The said negative electrode plate can be prepared according to the conventional method in this field. Usually, the negative electrode plate is obtained by dispersing the negative electrode active material and optional conductive agent, binder and thickener in a solvent in which the solvent may be deionized water to form an uniform negative electrode slurry, coating a negative electrode current collector with the negative electrode slurry and then carrying out the processes of drying and cold pressing.

There is no special restriction on the separator. Any known porous separator with chemical stability and mechanical stability can be selected, for example, glass fiber, non-woven fabrics, polyethylene, polypropylene, polyvinylidene dichloride, and their multi-layer composite film.

In some embodiments, the electrolyte can include an organic solvent and an electrolyte sodium salt. As an example, the organic solvent can include one or more of ethylene carbonate (EC), propylene carbonate (PC), ethyl methyl carbonate (EMC) and diethyl carbonate (DEC). The electrolyte sodium salt can include one or more of $NaPF_6$, $NaClO_4$, $NaBCl_4$, $NaSO_3CF_3$, and $Na(CH_3)C_6H_4SO_3$.

As the sodium ion battery of this application adopts the positive electrode active material in the first aspect of this application, it has a relatively high comprehensive electrochemical performance, including relatively high first-cycle specific discharge capacity and energy density, as well as relatively high rate performance and cycle performance. By adopting the positive electrode active material of this application, the electrochemical window of sodium ion battery is also enlarged to allow the sodium ion battery to charge and discharge within a relatively wide electrochemical window without affecting the specific capacity and energy density of the battery.

Figure 3:
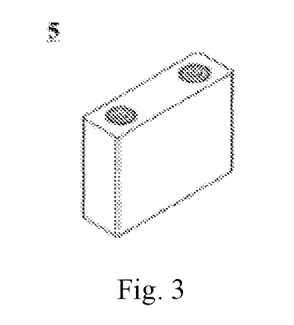
FIG. 3 is a schematic diagram of an embodiment of a sodium ion battery.

The present application does not have particular limitation to the shape of the sodium ion battery. The sodium ion battery may be cylindrical, square, or in other arbitrary shape. FIG. 3 shows a sodium ion battery 5 with a square structure as an example.

In some embodiments, the sodium ion battery may include an outer package for packaging the positive electrode plate, the negative electrode plate, and the electrolyte.

In some embodiments, the outer package of the sodium ion battery may be a soft bag, such as a pocket type soft bag. The material of the soft bag may be plastic, for example, it may include one or more of polypropylene (PP), polybutylene terephthalate (PBT), polybutylene succinate (PBS), and the like. The outer package of the sodium ion battery may also be a hard case, such as a hard plastic case, an aluminum case, a steel case, and the like.

Figure 4:
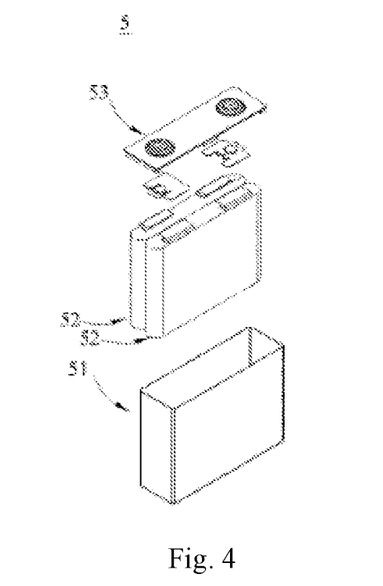
FIG. 4 is an exploded view of FIG. 3.

In some embodiments, referring to FIG. 4, the outer package may include a shell 51 and a cover plate 53. The shell 51 may include a bottom plate and side plates connected to the bottom plate, and the bottom plate and the side plates enclose a receiving cavity. The shell 51 has an opening communicated with the receiving cavity, and the cover plate 53 can cover the opening to close the receiving cavity.

The positive electrode plate, the negative electrode plate, and the separator may form an electrode assembly 52 by stacking or winding. The electrode assembly 52 is packaged in the receiving cavity. The electrolyte may adopt electrolyte liquid, and the electrolyte liquid infiltrates the electrode assembly 52.

The sodium ion battery 5 includes one or more electrode assemblies 52, which can be adjusted according to requirements.

In some embodiments, the sodium ion batteries may be assembled into a battery module, the battery module may include a plurality of secondary batteries, and the specific number can be adjusted according to the application and capacity of the battery module.

Figure 5:
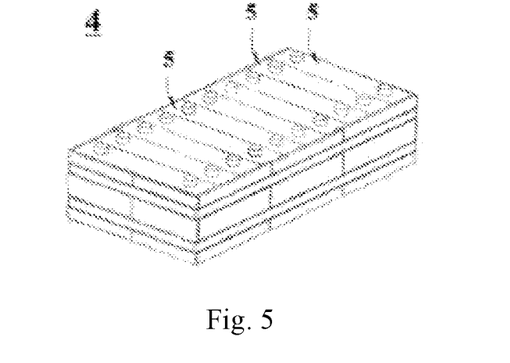
FIG. 5 is a schematic diagram of an embodiment of battery module.

FIG. 5 shows a battery module 4 as an example. Referring to FIG. 5, in the battery module 4, the plurality of sodium ion batteries 5 may be arranged sequentially in a length direction of the battery module 4. Of course, they may also be arranged in any other way. Further, a plurality of sodium ion batteries 5 may be fixed by fasteners.

Optionally, the battery module 4 may further include a housing having a receiving space, and a plurality of sodium ion batteries 5 are received in the receiving space.

In some embodiments, the above-mentioned battery module may also be assembled into a battery pack, and the number of battery modules included in the battery pack can be adjusted according to the application and capacity of the battery pack.

Figure 6:
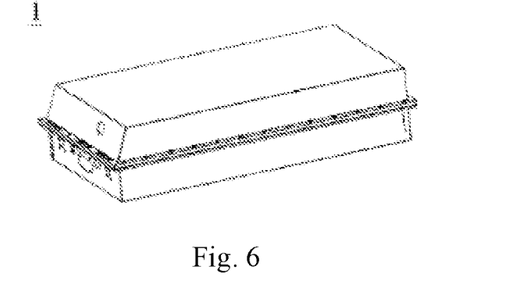
FIG. 6 is a schematic diagram of an embodiment of battery pack.
Figure 7:
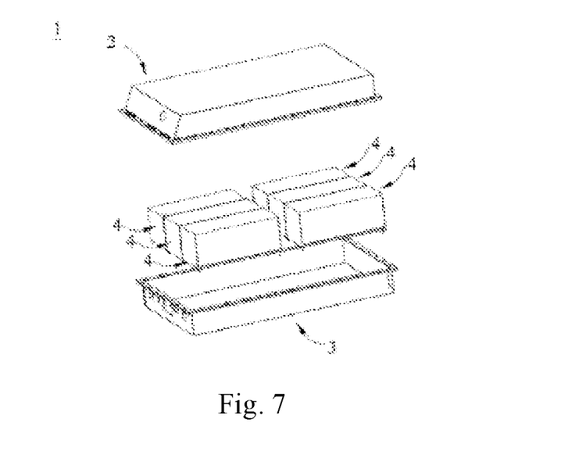
FIG. 7 is an exploded view of FIG. 6.

FIGS. 6 and 7 show a battery pack 1 as an example. Referring to FIGS. 6 and 7, the battery pack 1 may include a battery case and a plurality of battery modules 4 disposed in the battery cabinet. The battery cabinet includes an upper case body 2 and a lower case body 3. The upper case body 2 can cover the lower case body 3 to form a closed space for receiving the battery modules 4. A plurality of battery modules 4 can be arranged in the battery cabinet in any manner.

Apparatus

The fourth aspect of the present application provides an apparatus, the apparatus including the sodium ion battery according to the third aspect of the present application. The sodium ion battery can be used as a power source of the apparatus, or as an energy storage unit of the apparatus. The apparatus may be, but is not limited to, a mobile device (e.g., a mobile phone, a notebook computer, and the like), an electric vehicle (e.g., a pure electric vehicle, a hybrid electric vehicle, a plug-in hybrid electric vehicle, an electric bicycle, an electric scooter, an electric golf vehicle, an electric truck and the like), an electric train, a ship, a satellite, an energy storage system, and the like.

The apparatus may select the sodium ion battery, the battery module, or the battery pack according to its usage requirements.

Figure 8:
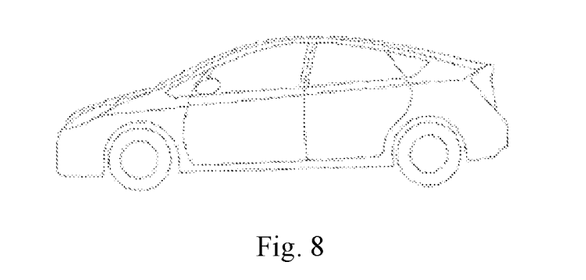
FIG. 8 is a schematic diagram of an embodiment of an apparatus using the sodium ion battery as a power source.

FIG. 8 shows an apparatus as an example. The apparatus is a pure electric vehicle, a hybrid electric vehicle, or a plug-in hybrid electric vehicle. In order to meet the requirements of the apparatus for high power and high energy density of the sodium ion battery, a battery pack or a battery module may be used.

As another example, the apparatus may be a mobile phone, a tablet computer, a notebook computer, and the like. The apparatus is generally required to be thin and light, and the sodium ion battery can be used as a power source.

EXAMPLES

The following examples more specifically describe the content disclosed in the present application, and these examples are only used for explanatory description, because various modifications and changes within the scope of the present disclosure are obvious to those skilled in the art. Unless otherwise stated, all parts, percentages, and ratios described in the following examples are based on weight, all reagents used in the examples are commercially available or synthesized according to conventional methods and can be directly used without further treatment, and all instruments used in the examples are commercially available.

Example 1

Preparation of Positive Electrode Active Material

S10. Copper sulfate pentahydrate and manganese sulfate monohydrate were dissolved in a deionized water in a stoichiometric ratio under the protection of inert atmosphere to prepare a mixed solution, in which the total concentration of metal ions was 1.2 mol/L.

S21. Sodium carbonate as a precipitant was dispersed in a deionized water to prepare a solution of precipitant, in which the concentration of sodium carbonate was 4 mol/L. An ammonia with a concentration of 2 mol/L was used as a solution of complexing agent.

S22. The solution of precipitant and the solution of complexing agent were added to the above mixed solution to obtain a reaction solution, and the pH value of the reaction solution was controlled to 11.0.

S30. The reaction solution was carried out reaction for 20 h at a temperature of 50° C. with a stirring rate of 800 rpm, the resulting coprecipitation product was isolated and collected. After that, the product was washed several times with a moderate amount of deionized water, and was dried at 100° C. in a vacuum drying oven to obtain a transitional metal source $[Cu_{1.1}Mn_{2.0}][CO_3]_{3.1}$.

S40. Sodium hydroxide and the transitional metal source were mixed uniformly in a stoichiometric ratio to obtain a mixture, and the mixture was sintered at a temperature of 800° C. under an air atmosphere for 16 h. After that, the sintered product was cooled to room temperature, and then washed several times with a moderate amount of deionized water followed by drying to obtain the positive electrode active material.

Preparation of Button Battery

1) Preparation of Positive Electrode Plate

The positive electrode active material prepared above, conductive black Super P, and PVDF as a binder at a weight ratio of 90:5:5 were mixed in an appropriate amount of N-methyl pyrrolidone (NMP) to form a uniform positive electrode slurry; the positive electrode slurry was coated on an aluminum foil as a positive electrode current collector. After drying, it was stamped into a wafer with a diameter of 14 mm.

2) Preparation of Negative Electrode Plate

A metallic sodium sheet was stamped into a wafer with a diameter of 14 mm.

3) Fiberglass Film was Used as a Separator.

4) Preparation of Electrolyte

Ethylene carbonate (EC) and propylene carbonate (PC) were mixed in an equal volume to get an organic solvent, and sodium perchlorate $NaClO_4$ was dissolved in the said organic solvent to obtain the electrolyte, in which the concentration of $NaClO_4$ was 1 mol/L.

5) The said positive electrode plate, separator, and negative electrode plate were stacked in order in which the said electrolyte was added and which was sealed to obtain the button battery.

Examples from 2 to 19 and Comparative Examples from 1 to 3

Examples from 2 to 19 and Comparative Examples from 1 to 3 are similar to example 1 with the exception that the reaction parameters for the preparation process of positive electrode active material were adjusted. Refer to Table 1 below for the specific parameters.

Test Section (1) Test of Rate Performance

At a temperature of 25° C. and under normal pressure of 0.1 MPa, the sodium ion batteries prepared by the examples and comparative examples were charged at a constant current to 4.3V at a rate of 2 C rate and then discharged to 2.1V at a rate of 2 C so as to get the specific discharge capacity of sodium ion battery at the rate of 2 C. 4 samples were tested for every example and Comparative Example, with an average taken for the test result.

(2) Test of Capacity Elaboration and Cycle Performance

At a temperature of 25° C. and under normal pressure of 0.1 MPa, the sodium ion batteries prepared by the examples and comparative examples were charged at a constant current to 4.3V at a rate of 0.1 C, where the charge capacity at this time was recorded as the first-cycle charge capacity of sodium ion battery; after set standing for 5 min, they were discharged at a constant current to 2.1V at a rate of 0.1 C, and then set standing for 5 min. This was a charging/discharging cycle. At this time, the discharge capacity was recorded as a first-cycle discharge specific capacity of the sodium-ion battery, which was the initial capacity of the sodium-ion battery. The sodium ion battery was subjected to the above charging/discharging cycle test for 300 cycles, and the specific discharge capacity at the $300^{th}$ cycle was detected.

The capacity retention rate of the sodium ion battery for 300 cycles (%)=the specific discharge capacity at the $300^{th}$ cycle/the specific discharge capacity at the first cycle×100%.

The test results of Examples 1 to 19 and Comparative Examples 1 to 3 were shown in Table 2 below.

TABLE 1

| | Copper salt | Manganese salt | M salt | Total concentration of metal ions mol/L | Type and concentration of precipitant | Type and concentration of complexing agent | PH | Reaction temperature and time | Sintering temperature and time |
|---|---|---|---|---|---|---|---|---|---|
| Example 1 | Copper sulfate | Manganese sulfate | / | 1.2 | 4 mol/L Sodium carbonate | 2 mol/L Ammonia | 11.0 | 50° C. 20 h | 800° C. 16 h |
| Example 2 | Copper sulfate | Manganese sulfate | / | 1.2 | 4 mol/L Sodium carbonate | 2 mol/L Ammonia | 11.0 | 50° C. 20 h | 800° C. 12 h |
| Example 3 | Copper sulfate | Manganese sulfate | / | 1.2 | 4 mol/L Sodium carbonate | 2 mol/L Ammonia | 11.0 | 50° C. 20 h | 800° C. 8 h |
| Example 4 | Copper nitrate | Manganese nitrate | / | 1.8 | 6 mol/L Sodium carbonate | 1 mol/L Ammonia | 11.4 | 55° C. 20 h | 760° C. 16 h |
| Example 5 | Copper nitrate | Manganese nitrate | / | 1.8 | 6 mol/L Sodium carbonate | 1 mol/L Ammonia | 11.4 | 55° C. 20 h | 760° C. 12 h |
| Example 6 | Copper nitrate | Manganese nitrate | / | 1.8 | 6 mol/L Sodium carbonate | 1 mol/L Ammonia | 11.4 | 55° C. 20 h | 760° C. 8 h |
| Example 7 | Copper nitrate | Manganese nitrate | / | 2.2 | 6 mol/L Sodium carbonate | 2 mol/L Ammonia | 11.6 | 60° C. 20 h | 720° C. 12 h |
| Example 8 | Copper nitrate | Manganese nitrate | / | 2.2 | 6 mol/L Sodium carbonate | 2 mol/L Ammonia | 11.6 | 60° C. 20 h | 720° C. 8 h |
| Example 9 | Copper sulfate | Manganese sulfate | / | 2.48 | 6 mol/L Sodium carbonate | 1 mol/L Ammonia | 11.4 | 50° C. 20 h | 760° C. 16 h |
| Example 10 | Copper sulfate | Manganese sulfate | / | 2.34 | 5 mol/L Sodium carbonate | 1 mol/L Ammonia | 11.4 | 50° C. 20 h | 760° C. 16 h |
| Example 11 | Copper sulfate | Manganese sulfate | / | 2.31 | 4 mol/L Sodium carbonate | 1 mol/L Ammonia | 11.4 | 50° C. 20 h | 760° C. 16 h |
| Example 12 | Copper sulfate | Manganese sulfate | / | 2.13 | 5 mol/L Sodium carbonate | 2 mol/L Ammonia | 11.4 | 50° C. 20 h | 760° C. 16 h |
| Example 13 | Copper sulfate | Manganese sulfate | / | 2.48 | 5 mol/L Sodium carbonate | 1 mol/L Ammonia | 11.4 | 50° C. 20 h | 760° C. 16 h |
| Example 14 | Copper sulfate | Manganese sulfate | / | 2.18 | 5 mol/L Sodium carbonate | 1 mol/L Ammonia | 11.4 | 50° C. 20 h | 760° C. 16 h |
| Example 15 | Copper sulfate | Manganese sulfate | / | 2.27 | 5 mol/L Sodium carbonate | 1 mol/L Ammonia | 11.4 | 50° C. 20 h | 760° C. 16 h |
| Example 16 | Copper sulfate | Manganese sulfate | / | 2.06 | 5 mol/L Sodium carbonate | 1 mol/L Ammonia | 11.4 | 50° C. 20 h | 760° C. 16 h |
| Example 17 | Copper sulfate | Manganese sulfate | / | 2.13 | 5 mol/L Sodium carbonate | 1 mol/L Ammonia | 11.4 | 50° C. 20 h | 760° C. 16 h |
| Example 18 | Copper sulfate | Manganese sulfate | Zinc sulfate | 2.13 | 5 mol/L Sodium carbonate | 1 mol/L Ammonia | 11.4 | 50° C. 20 h | 760° C. 16 h |
| Example 19 | Copper sulfate | Manganese sulfate | / | 2.2 | 5 mol/L Sodium carbonate | 1 mol/L Ammonia | 11.2 | 50° C. 20 h | 760° C. 16 h |
| Comparative Example 1 | Copper sulfate | Manganese sulfate | / | 2.77 | 6 mol/L Sodium carbonate | 1 mol/L Ammonia | 11.2 | 50° C. 20 h | 760° C. 16 h |
| Comparative Example 2 | Copper sulfate | Manganese sulfate | / | 1.42 | 4 mol/L Sodium carbonate | 1 mol/L Ammonia | 11.2 | 50° C. 20 h | 700° C. 16 h |
| Comparative Example 3 | Copper sulfate | Manganese sulfate | / | 2.13 | 5 mol/L Sodium carbonate | 1 mol/L Ammonia | 11.2 | 50° C. 20 h | 760° C. 16 h |

TABLE 2

| | Positive electrode active material | Specific surface area $m^2/g$ | $D_v 50$ $\mu m$ | Powder resistivity $\Omega \cdot cm$ | First-cycle specific discharge capacity mAh/g | Rate performance mAh/g | capacity retention rate of the sodium ion battery for 300 cycles % |
|---|---|---|---|---|---|---|---|
| Example 1 | $Na_{2.2}Cu_{1.1}Mn_{2.0}O_7$ | 0.01 | 25 | 10 | 110 | 105 | 99 |
| Example 2 | $Na_{2.2}Cu_{1.1}Mn_{2.0}O_7$ | 0.1 | 15 | 20 | 109 | 102 | 98 |
| Example 3 | $Na_{2.2}Cu_{1.1}Mn_{2.0}O_7$ | 1 | 10 | 300 | 107 | 100 | 95 |
| Example 4 | $Na_{2.2}Cu_{1.1}Mn_{2.0}O_7$ | 2 | 8 | 1k | 104 | 97 | 95 |
| Example 5 | $Na_{2.2}Cu_{1.1}Mn_{2.0}O_7$ | 5 | 6 | 3k | 99 | 93 | 93 |
| Example 6 | $Na_{2.2}Cu_{1.1}Mn_{2.0}O_7$ | 10 | 3 | 10k | 96 | 91 | 91 |
| Example 7 | $Na_{2.2}Cu_{1.1}Mn_{2.0}O_7$ | 15 | 1 | 100k | 95 | 90 | 90 |
| Example 8 | $Na_{2.2}Cu_{1.1}Mn_{2.0}O_7$ | 20 | 0.5 | 300k | 93 | 86 | 88 |
| Example 9 | $Na_{2.0}Cu_{0.5}Mn_{3.0}O_7$ | 3 | 7 | 2k | 98 | 85 | 86 |
| Example 10 | $Na_{2.3}Cu_{0.35}Mn_{2.7}O_7$ | 3 | 7 | 3k | 113 | 96 | 85 |
| Example 11 | $Na_{2.3}Cu_{0.7}Mn_{2.5}O_7$ | 3 | 7 | 1k | 102 | 86 | 85 |
| Example 12 | $Na_{2.1}Cu_{1.2}Mn_{2.0}O_7$ | 3 | 7 | 8k | 96 | 90 | 92 |
| Example 13 | $Na_{2.5}Cu_{2.0}Mn_{1.0}O_7$ | 3 | 7 | 6k | 88 | 70 | 90 |
| Example 14 | $Na_{2.2}Cu_{0.8}Mn_{2.2}O_7$ | 3 | 7 | 3k | 100 | 93 | 96 |
| Example 15 | $Na_{2.4}Cu_{1.0}Mn_{2.0}O_7$ | 3 | 7 | 3k | 98 | 91 | 94 |
| Example 16 | $Na_{2.0}Cu_{0.9}Mn_{2.0}O_7$ | 3 | 7 | 800 | 90 | 71 | 83 |
| Example 17 | $Na_{2.0}Cu_{0.6}Mn_{2.4}O_7$ | 3 | 7 | 600 | 96 | 85 | 87 |
| Example 18 | $Na_{2.0}Cu_{0.4}Zn_{0.2}Mn_{2.4}O_7$ | 6 | 9 | 4k | 111 | 100 | 91 |
| Example 19 | $Na_{2.3}Cu_{1.1}Mn_{2.0}O_7$ | 1 | 2 | 9k | 77 | 72 | 79 |
| Comparative Example 1 | $Na_{2.0}Cu_{1.4}Mn_{2.5}O_7$ | 2 | 8 | 900 | 70 | 60 | 67 |
| Comparative Example 2 | $Na_{2.3}Cu_{0.3}Mn_{2.0}O_7$ | 2 | 8 | 2k | 91 | 69 | 43 |
| Comparative Example 3 | $Na_{2.7}Cu_{1.5}Mn_{2.5}O_7$ | 2 | 7 | 4k | 71 | 63 | 56 |

By comparing Examples of 1-19 with Comparative Examples of 1-2, it can be seen that, by making the positive electrode active material to satisfy the chemical formula $Na_{2+x}Cu_hMn_kM_lO_{7-y}$, wherein $2 \leq h+k+l \leq 3.5$ and $0.57 \leq (2+x)/(h+k+l) \leq 0.9$, the comprehensive electrochemical performance of the material can be significantly improved so that the positive electrode active material had relatively high capacity elaboration, rate performance, and cycle performance.

In the Comparative Example 3, the sodium content of the positive electrode active material was relatively high, the stability of the material to air, water, and $CO_2$ was relatively poor, the first-cycle specific discharge capacity was relatively low, the rate performance was relatively poor, and the capacity retention ratio during charging/discharging cycles was relatively low.

In conclusion, the present application significantly improved the first-cycle specific discharge capacity, the electric performance at a large current, and the capacity retention ratio during charging/discharging cycles of the positive electrode active material by making the positive electrode active material with the specific chemical composition as described above so that the positive electrode active material may have both relatively high capacity elaboration and relatively high rate performance and cycle performance.

Some exemplary embodiments of the present invention are provided as follows.

Embodiment 1. A positive electrode active material, satisfying a chemical formula $Na_{2+x}Cu_hMn_kM_lO_{7-y}$, wherein M is one or more selected from Li, B, Mg, Al, K, Ca, Ti, V, Cr, Fe, Co, Ni, Zn, Ga, Sr, Y, Nb, Mo, Sn, Ba and W, $0 x \leq Mo$, $0.1 \leq h \leq 0$. $10 k \leq 0$. $001 \leq 0.1 \leq$ and $0 ay \leq an$ $2ah+k+l \leq +k+1$ and $0.57$ $Snx)/(h+k+l)+k+1$ S Embodiment 2. The positive electrode active material according to Embodiment 1, wherein in the chemical formula, $0.6 \leq (2+x)/(h+k+l) \leq 0.8$.

Embodiment 3. The positive electrode active material according to Embodiment 1 or 2, wherein in the chemical formula, $0.5 \leq h \leq 1.5$, $1.5 \leq k \leq 2.5$, preferably, $0.9 \leq h \leq 1.5$; more preferably, $0.9 \leq h \leq 1.2$.

Embodiment 4. The positive electrode active material according to any one of Embodiments 1-3, wherein in the chemical formula, $k/(h+l) \geq 1.4$, preferably $1.6 \leq k/(h+l) \leq 6$.

Embodiment 5. The positive electrode active material according to any one of Embodiments 1-4, wherein
the positive electrode active material has a specific surface area of from 0.01 $m^2/g$ to 20 $m^2/g$, preferably from 0.1 $m^2/g$ to 15 $m^2/g$; and/or,
the positive electrode active material has a mean particle size $D_v50$ of from 0.5 $\mu m$ to 25 $\mu m$, preferably from 1 $\mu m$ to 15 $\mu m$.

Embodiment 6. The positive electrode active material according to any one of Embodiments 1-5, wherein the positive electrode active material is of a triclinic phase crystal structure or a hexagonal phase crystal structure.

Embodiment 7. The positive electrode active material according to Embodiments 6, wherein the positive electrode active material comprises a first diffraction peak at an X-ray diffraction angle 2θ of from 15.8° to 16.0° and a second diffraction peak at an X-ray diffraction angle 2θ of from 32.0° to 32.2°, and an intensity ratio of the first diffraction peak to the second diffraction peak is from 5 to 30, the first diffraction peak has a full width at half maxima of from 0.02° to 0.5°, and the second diffraction peak has a full width at half maxima of from 0.02° to 0.5°.

Embodiment 8. The positive electrode active material according to any one of Embodiments 1-7, wherein the positive electrode active material has a powder resistivity of from 10 $\Omega \cdot cm$ to 300 $\Omega \cdot cm$ at a pressure of 12 MPa, preferably from 20 $\Omega \cdot cm$ to 3 $k\Omega \cdot cm$.

Embodiment 9. The positive electrode active material according to any one of Embodiments 1-8, wherein
the positive electrode active material has a tap density of from 0.5 $g/cm^3$ to 3.5 $g/cm^3$, preferably from 1.5 $g/cm^3$ to 3.0 $g/cm^3$; and/or, the positive electrode active material has a compaction density of from 2.5 g/cm³ to 4.5 g/cm³ at a pressure of 8 tons, preferably from 3.5 g/cm³ to 4.5 g/cm³.

Embodiment 10. The positive electrode active material according to any one of Embodiments 1-9, wherein the positive electrode active material has a first discharge voltage plateau of from 3.8V to 4.1V and a second discharge voltage plateau of from 3.4V to 3.7V.

Embodiment 11. The positive electrode active material according to Embodiment 10, wherein the positive electrode active material has a discharge capacity of $Q_1$ at the first discharge voltage plateau, a discharge capacity of $Q_2$ at the second discharge voltage plateau, and a full discharge capacity of Q, and $Q_1$, $Q_2$ and Q satisfy:

$$30\%\leq 0\%_1+Q_2)/Qd\ Q\ \text{satisf preferably } 50\%\ efe_1+Q_2)/Q\text{eferably } f$$

Embodiment 12. A method for preparing a positive electrode active material, comprising the following steps:
providing a mixed solution, wherein the mixed solution comprises copper salts and manganese salts, and salts containing an M element are present in the mixed solution in an amount of 0 or more;
adding a precipitant and a complexing agent into the mixed solution, and then subjecting it to coprecipitation to obtain a precursor; and
mixing the precursor and a sodium source to obtain a mixture and sintering the mixture to obtain the positive electrode active material,
wherein the positive electrode active material satisfies a chemical formula $Na_{2+x}Cu_hMn_kM_lO_{7-y}$, wherein M is one or more selected from of Li, B, Mg, Al, K, Ca, Ti, V, Cr, Fe, Co, Ni, Zn, Ga, Sr, Y, Nb, Mo, Sn, Ba and W; 0x≤Mo, 0.1<h≤0. 10k≤0. 00 l≤l 1≤0ly≤l 2lh+k+l≤l 1< and 0.57 Snx)/h+k+l)/(7 S Embodiment 13. A sodium-ion battery, comprising a positive electrode plate, wherein the positive electrode plate comprises the positive electrode active material according to any one of Embodiments 1-11.

Embodiment 14. An apparatus, comprising the sodium-ion battery according to Embodiment 13.

Described above are merely specific embodiments of the present application, but the protection scope of the present application is not limited to this. Any skilled person who is familiar with this art could readily conceive of various equivalent modifications or substitutions within the disclosed technical scope of the present application, and these modifications or substitutions shall fall within the protection scope of the present application. Therefore, the protection scope of the present application shall be subject to the protection scope of the claims.

What is claimed is:

1. A positive electrode active material, satisfying a chemical formula $Na_{2+x}Cu_hMn_kM_lO_{7-y}$, wherein M is one or more selected from Li, B, Mg, Al, K, Ca, Ti, V, Cr, Fe, Co, Ni, Zn, Ga, Sr, Y, Nb, Mo, Sn, Ba and W, 0≤x≤0.5, 0.1<h≤2, 1≤k≤3, 0≤l≤0.5, and 0≤y≤1, 3.0≤h+k+l≤3.1, and 0.7≤(2+x)/(h+k+l)≤0.73, and
wherein the positive electrode active material has a powder resistivity of from 10 Ω·cm to 3kΩ·cm at a pressure of 12 MPa,
wherein the positive electrode active material has a specific surface area of from 0.01 m²/g to 3 m²/g; and,
wherein the positive electrode active material has a mean particle size $D_V50$ of from 7 μm to 25 μm.

2. The positive electrode active material according to claim 1, wherein in the chemical formula, 0.5≤h≤1.5, 1.5≤k≤2.5.

3. The positive electrode active material according to claim 1, wherein in the chemical formula, k/(h+l)≥1.4.

4. The positive electrode active material according to claim 1, wherein the positive electrode active material is of a triclinic phase crystal structure or a hexagonal phase crystal structure.

5. The positive electrode active material according to claim 4, wherein the positive electrode active material comprises a first diffraction peak at an X-ray diffraction angle 2θ of from 15.8° to 16.0° and a second diffraction peak at an X-ray diffraction angle 2θ of from 32.0° to 32.2°, and an intensity ratio of the first diffraction peak to the second diffraction peak is from 5 to 30, the first diffraction peak has a full width at half maxima of from 0.02° to 0.5°, and the second diffraction peak has a full width at half maxima of from 0.02° to 0.5°.

6. The positive electrode active material according to claim 1, wherein
the positive electrode active material has a tap density of from 0.5 g/cm³ to 3.5 g/cm³; and/or,
the positive electrode active material has a compaction density of from 2.5 g/cm³ to 4.5 g/cm³ at a pressure of 8 tons.

7. The positive electrode active material according to claim 1, wherein the positive electrode active material has a first discharge voltage plateau of from 3.8V to 4.1V and a second discharge voltage plateau of from 3.4V to 3.7V.

8. The positive electrode active material according to claim 7, wherein the positive electrode active material has a discharge capacity of $Q_1$ at the first discharge voltage plateau, a discharge capacity of $Q_2$ at the second discharge voltage plateau, and a full discharge capacity of Q, and $Q_1$, $Q_2$ and Q satisfy:

$$30\%\leq (Q_1+Q_2)/Q\times 100\%\leq 90\%.$$

9. A method for preparing a positive electrode active material, comprising the following steps:
providing a mixed solution, wherein the mixed solution comprises copper salts and manganese salts, and salts containing an M element are present in the mixed solution in an amount of 0 or more;
adding a precipitant and a complexing agent into the mixed solution, and then subjecting it to coprecipitation to obtain a precursor; and
mixing the precursor and a sodium source to obtain a mixture and sintering the mixture to obtain the positive electrode active material,
wherein the positive electrode active material satisfies a chemical formula $Na_{2+x}Cu_hMn_kM_lO_{7-y}$, wherein M is one or more selected from of Li, B, Mg, Al, K, Ca, Ti, V, Cr, Fe, Co, Ni, Zn, Ga, Sr, Y, Nb, Mo, Sn, Ba and W; 0≤x≤0.5, 0.1<h≤2, 1≤k≤3, 0≤l≤0.5, 0≤y≤1, 3.0≤h+k+l≤3.1, and 0.7≤(2+x)/(h+k+l)≤0.73, and
wherein the positive electrode active material has a powder resistivity of from 10 Ω·cm to 3 kΩ·cm at a pressure of 12 MPa,
wherein the positive electrode active material has a specific surface area of from 0.01 m²/g to 3 m²/g; and,
wherein the positive electrode active material has a mean particle size $D_V50$ of from 7 μm to 25 μm.

10. A sodium-ion battery, comprising a positive electrode plate, wherein the positive electrode plate comprises a positive electrode active material satisfying a chemical formula $Na_{2+x}Cu_hMn_kM_lO_{7-y}$, wherein M is one or more selected from Li, B, Mg, Al, K, Ca, Ti, V, Cr, Fe, Co, Ni, Zn, Ga, Sr, Y, Nb, Mo, Sn, Ba and W, $0 \leq x \leq 0.5$, $0.1 < h \leq 2$, $1 \leq k \leq 3$, $0 \leq l \leq 0.5$, and $0 \leq y \leq 1$, $3.0 \leq h+k+l \leq 3.1$, and $0.7 \leq (2+x)/(h+k+l) \leq 0.73$, and wherein the positive electrode active material has a powder resistivity of from 10 Ω·cm to 3kΩ·cm at a pressure of 12 MPa, wherein the positive electrode active material has a specific surface area of from 0.01 m$^2$/g to 3 m$^2$/g; and, wherein the positive electrode active material has a mean particle size $D_V50$ of from 7 μm to 25 μm.

11. The sodium-ion battery according to claim 10, wherein in the chemical formula, $0.5 \leq h \leq 1.5$, $1.5 \leq k \leq 2.5$.

12. The sodium-ion battery according to claim 10, wherein in the chemical formula, $k/(h+l) \geq 1.4$.

13. The sodium-ion battery according to claim 10, wherein the positive electrode active material is of a triclinic phase crystal structure or a hexagonal phase crystal structure.

14. The sodium-ion battery according to claim 13, wherein the positive electrode active material comprises a first diffraction peak at an X-ray diffraction angle 2θ of from 15.8° to 16.0° and a second diffraction peak at an X-ray diffraction angle 2θ of from 32.0° to 32.2°, and an intensity ratio of the first diffraction peak to the second diffraction peak is from 5 to 30, the first diffraction peak has a full width at half maxima of from 0.02° to 0.5°, and the second diffraction peak has a full width at half maxima of from 0.02° to 0.5°.

15. The sodium-ion battery according to claim 10, wherein the positive electrode active material has a first discharge voltage plateau of from 3.8V to 4.1V and a second discharge voltage plateau of from 3.4V to 3.7V.

* * * * *